United States Patent Office 2,959,988
Patented Nov. 15, 1960

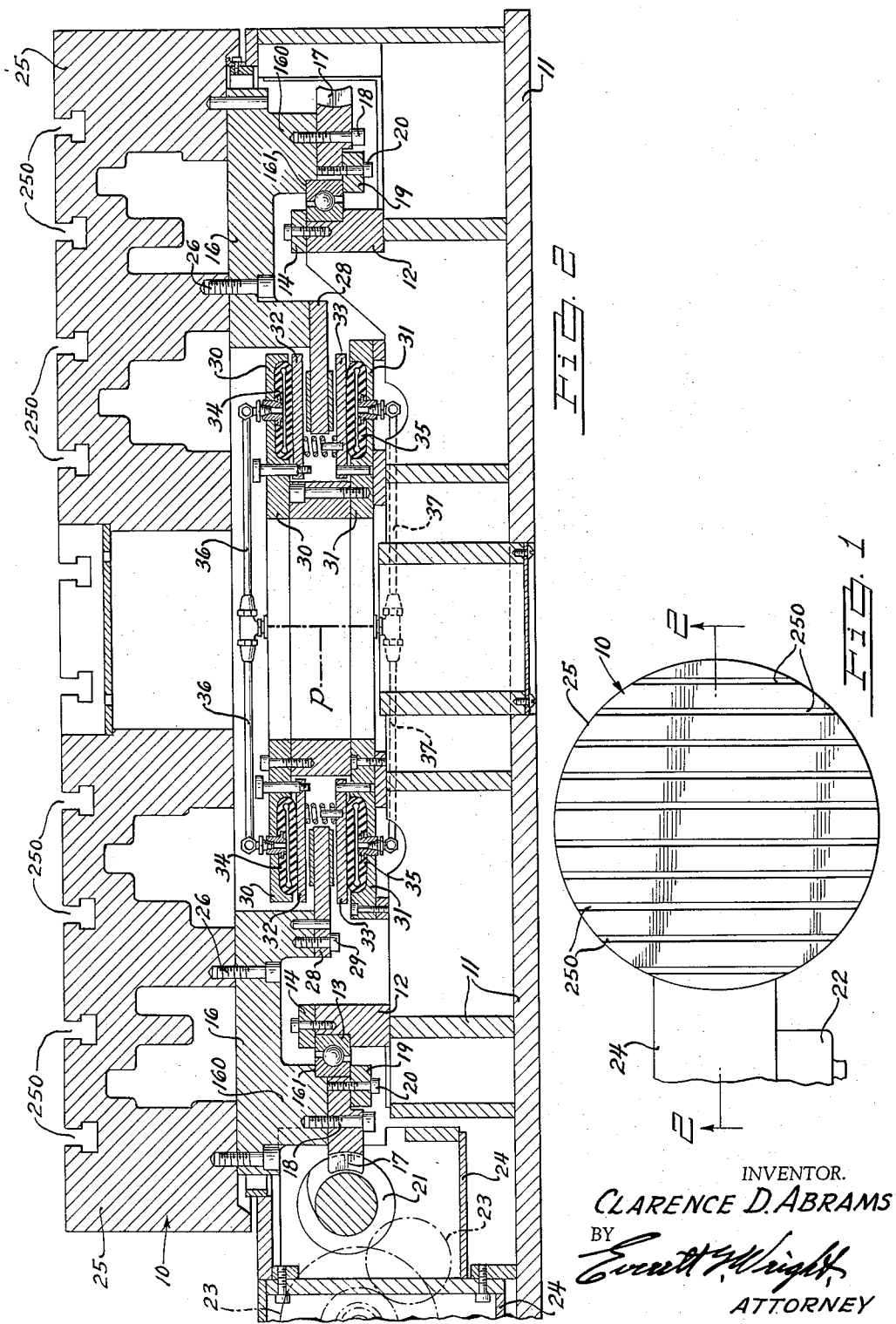

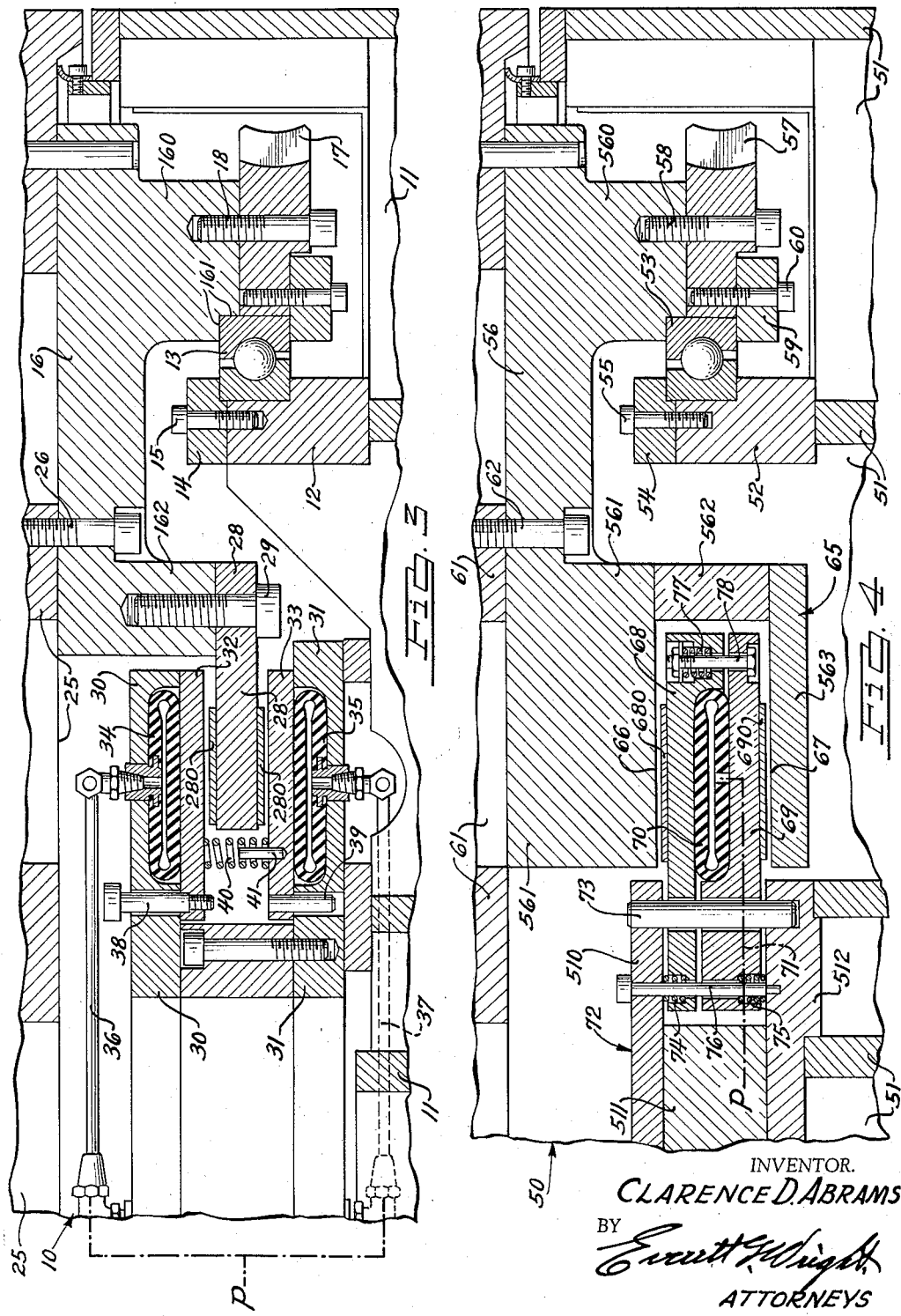

2,959,988

REVOLVING WORK TABLES FOR MACHINE TOOLS AND THE LIKE

Clarence D. Abrams, Detroit, Mich., assignor to Swift-Ohio Corporation, a corporation of Michigan Filed Mar. 28, 1957, Ser. No. 649,212

5 Claims. (Cl. 74—813)

This invention relates to a turnable or revolving work table and in particular to means for rotatably mounting a work table and fixedly clamping the same in any position to which it may be revolved or indexed, all in such a manner that no substantial increased thrust or radial forces are applied to the bearings on which the work table is revolvably mounted when the said work table is clamped in a fixed position.

A further object of the invention is to provide an indexable work table revolvably or turnably mounted on combined thrust and radial bearing means including means for clamping and fixedly holding the said work table in any indexed position without substantially increasing the loading normally applied on the said bearing means during the revolving or indexing of the said revolvable work table.

Another object of the invention is to provide a turnable or revolvable work table including fluid operated means for firmly fixing the same against rotation in any indexed position and simultaneously relieving excessive loading of the bearings on which the work table is revolvably mounted during the performance of machining or other operations on work carried by or fixed to the said revolvable work table.

Other objects of the invention will become apparent by reference to the following detailed description taken in connection with the accompanying drawings in which:

Fig. 1 is a more or less diagrammatic top view of a revolvable or turnable work table embodying the invention.

Fig. 2 is a sectional view taken on the line 2—2 of Fig. 1 showing a preferred construction of a turnable or revolvable work table embodying the invention.

Fig. 3 is an enlarged fragmentary sectional view similar to Fig. 2 more clearly showing the preferred construction.

Fig. 4 is a fragmentary sectional view similar to Fig. 3 showing an alternate construction of the improved turnable or revolvable work table embodying the invention.

Referring now to the drawings wherein like numerals refer to like and corresponding parts throughout the several views, a preferred form of work table mechanism 10 embodying the invention is disclosed in Figs. 1, 2 and 3, and consists of a base 11 including a bearing ring 12 which is formed to support the inner race of a large combined radial and thrust bearing 13 which is fixed thereto by such suitable means as an anchor ring 14 and studs 15. A work table 16 is supported on the outer race of the said bearing 13 on an annular mounting ring 160 preferably formed integral with the said work table 16 and shouldered to receive the said outer race of the bearing 13. An annular worm gear 17 is secured to the said mounting ring 160 of the work table 16 by suitable studs 18. An anchor ring 19 secured by studs 20 to the said worm gear 17 fixes the work table 16 to the outer race of the ball bearing 13 at a suitable annular notch 161 in the mounting ring 160.

A worm 21 driven by a motor 22 through suitable reduction gearing 23 disposed in a reduction gear box 24 is employed to revolve or turn the work table 16 on its anti-friction bearing 13 to the extent required to index work mounted on the said work table 16 in respect to a machine tool means, not shown. For this purpose, the work table 16 may have a work holder bed 25 secured thereon by means of suitable studs 26. The said work holder bed 25 is preferably provided with a plurality of keyways 250 to accommodate the securement of work or work holders thereto. Inasmuch as the drive generally designated by the numerals 22, 23 and 24, and the indexing means, not shown, can be selected from a number of prior art constructions and do not constitute a novel element of the instant invention, they have not been shown or described in detail.

A horizontally disposed annular locking tongue 28 is fixed by suitable studs 29 to an annular mounting ring or boss 162 preferably formed integral with the work table 16. Supported from the central portion of the base 11 are upper and lower horizontally disposed annular supports 30 and 31 for upper and lower annular locking shoes 32 and 33 respectively which are disposed in spaced relationship respectively above and below the said annular locking tongue 28 carried by the work table 16. Interposed between the said upper and lower annular supports 30 and 31 and the upper and lower locking shoes 32 and 33 respectively are upper and lower preferably flattened fluid expansible tubular pressure means 34 and 35 having suitable fluid connections 36 and 37 respectively through which fluid under pressure is supplied thereto from a fluid pressure source P as indicated by dot and dash lines in Figs. 2 and 3. Fluid under pressure from the source P is employed to inflate the said upper and lower tubular pressure means 34 and 35 simultaneously and thereby apply the locking shoes 32 and 33 uniformly to both sides of the locking tongue 28 whereby to fix the said work table 16 into any position to which it may be turned or indexed. The said locking tongue 28 may have wearing strips or liners 280 fixed thereto. The said fluid pressure P is preferably oil or other suitable liquid fluid pressure as distinguished from air pressure because of the relative incompressibility thereof.

The said upper and lower locking shoes 32 and 33 are properly annularly located by such means as a plurality of circumferentially spaced vertically disposed guide pins 38 and 39 threaded and pressed respectively into the said upper and lower annular locking shoes 32 and 33 and slidably telescoping through the said upper and lower horizontally disposed annular supports 30 and 31 respectively. A plurality of vertically circumferentially spaced compression springs 40 held in position by suitable locater pins 41 fixed in the lower annular locking shoe 33 maintain the said annular locking shoes 32 and 33 in spaced relationship in respect to the annular locking tongue 28 of the work table 16 except when fluid under pressure is applied from the source P simultaneously to the said fluid expansible tubular pressure means 34 and 35.

With the foregoing construction, when fluid under pressure from the source P is applied to the said annular fluid expansible pressure means 34 and 35 simultaneously, the gripping of the annular locking shoes 32 and 33 on each side of the locking tongue 28 firmly fixes the work table 16, and the work holder bed 25 thereof, in any position to which it may have been indexed in such a manner that substantially no additional loading is applied to the anti-friction bearing 13 upon which the said work table 16 is turnably mounted. When the said work table mechanism 10 is in its pressure locked position, a substantial portion of all of the forces applied to work secured on the work holder bed 25 of the work table 16 resulting from machining, drilling or performing like operations on such work are transferred directly to the base 11 thereby preventing excessive loading of the anti-friction bearing 18.

Fig. 4 shows an alternate form of the work table mechanism disclosed in Figs. 1–3 inclusive. In the Fig. 4 construction, the work table mechanism 50 consists of a base 51 including a bearing ring 52 which is formed to support the inner race of a large combined radial and thrust bearing 53 which is fixed thereto by such suitable means as an anchor ring 54 and studs 55. A work table 56 is supported on the outer race of the said bearing 53 on an annular mounting ring 560 preferably formed integral with the said work table 56 and shouldered to receive the said outer race of the bearing 53. The said work table 56 is preferably rotated or indexed on the said bearing 53 by means of a worm drive (not shown) which engages a worm gear 57 secured to the said mounting ring 560 by suitable studs 58. An anchor ring 59 secured by studs 60 to the worm gear 57 fixes the work table 56 to the outer race of the said bearing 53. The work table 56 is preferably provided with a work holder bed 61 having a plurality of keyways therein (not shown) to facilitate the securing of work holders or work thereto. The work holder bed 61 is secured to the said work table 56 by such means as studs 62.

The work table 56 is provided with an annular radially inwardly disposed locking channel generally designated by the numeral 65 formed by an annular boss 561 located on the bottom of the work table 56, an annular spacer 562 and an annular plate 563 secured together by suitable means not shown. The said locking channel 65 provides upper and lower fixed annular locking surfaces 66 and 67 against which wearing strips 680 and 690 of upper and lower locking shoes 68 and 69 respectively may be forced into engagement by an annular flattened fluid expansible tubular pressure means 70 interposed between the said locking shoes 68 and 69. Fluid under pressure from a suitable fluid pressure source P is applied through suitable fluid pressure lines not shown but indicated by dot and dash lines 71 in Fig. 4. The said locking shoes 68 and 69 are floatingly mounted in a suitable annular fixed radially outwardly disposed locking shoe channel generally designated by the numeral 72 formed in the base 51 by an upper annular flange 510, an annular spacer 511 and a lower annular flange 512 secured together and to the said base 51 by suitable means not shown.

The upper and lower locking shoes 68 and 69 are properly annularly located in respect to the locking shoe channel 72 by such means as a plurality of circumferentially spaced vertically disposed guide pins 73 fixed in the upper and lower annular flanges 511 and 512 of the said channel 72 and extending through the upper and lower locking shoes 68 and 69. Suitable spring means 74 and 75 mounted on a pin 76, and spring means 77 mounted on a bolt 78 preferably as shown in Fig. 4 are employed to constantly urge the said upper and lower locking shoes 68 and 69 toward each other under the opposition of the inherent resiliency of the annular flattened fluid expansible tubular pressure means 70 when not under fluid pressure, thus freeing the locking shoes 68 and 69 from the upper and lower locking surfaces 66 and 67 respectively of the locking channel 65 of the work table 56 whereby to permit the said work table 56 to be turned and indexed.

With the modified construction disclosd in Fig. 4, when fluid under pressure from the fluid pressure source P is applied to the said annular fluid pressure means 70, the annular locking shoes 68 and 69 are expanded with respect to each other into gripping engagement with the upper and lower locking surfaces 66 and 67 respectively of the locking channel 65 on the work table 56 and the locking shoe channel 72 on the base 51 whereby to firmly support the work table 56 in any position to which it may have been indexed in such a manner that substantially no additional loading is applied to the anti-friction bearing 53 upon which the said work table 56 is turnably mounted. When the said work table mechanism 50 is in its pressure locked position, a substantial portion of all of the forces applied to work secured on the work holder bed 61 of the work holder 56 resulting from machining, drilling or performing like operations on such work are transmitted directly to the base 11.

Although but a single embodiment of the invention and one modification thereof has been disclosed and described herein, it is obvious that many changes may be made in the size, shape, arrangement and detail of the various elements of the invention, all without departing from the spirit and scope thereof as defined by the appended claims.

I claim:

1. A work table for machine tools and the like comprising a base, an anti-friction annular bearing including upper and lower races with roller means therebetween, the lower bearing race being fixed to and supported on the said base near the outer periphery thereof, a work table structure including a work holding and supporting bed of substantial weight capable of accommodating work pieces upon which machining operations are performed, said work table structure being mounted adjacent its outer periphery on said upper bearing race for turning in respect to said base, means for turning said work table to any desired position in respect to said base, an annular locking element carried by one of said base and table structure radially inwardly of said bearing, annular shoe means carried by the other of said base and table structure axially adjacent said locking element, and an annular fluid actuated axially expansible means disposed axially between said shoe means and said one base and table structure adapted when expanded to move said annular shoe means into engagement with said annular locking element on the other of said base and table structure axially fixing said work table in any position to which it may have been turned for machining operations and the like without transmittal of any material increase in loading on said anti-friction bearing as a result of said operations.

2. A work table for machine tools and the like comprising a base, an anti-friction annular bearing including upper and lower races with roller means therebetween, the lower bearing race being fixed to and supported on the said base near the outer periphery thereof, a work table structure including a work holding and supporting bed of substantial weight capable of accommodating work pieces upon which machining operations are performed, said work table structure being mounted adjacent its outer periphery on said upper bearing race for turning in respect to said base, and annular gear means fixed on said table at the outer periphery thereof and power driven gear means fixed to said base engaged with said annular gear means for turning said work table to any desired position in respect to said base, an annular locking tongue fixed on said table structure disposed radially inwardly of said bearing, double annular shoe means carried by said base with one shoe means disposed axially adjacent each side of said locking tongue, and annular fluid actuated axially expansible means disposed axially between each said shoe means and said base adapted when expanded to move said annular shoe means into axial engagement with said annular locking tongue on said table structure axially gripping said tongue and fixing said work table in any position to which it may have been turned for machining operations and the like without transmittal of any material increase in loading on said anti-friction bearing as a result of said operations.

3. A work table for machine tools and the like comprising a base, an anti-friction annular bearing including upper and lower races with roller means therebetween, the lower bearing race being fixed to and supported on the said base near the outer periphery thereof, a work table structure mounted adjacent its outer periphery on said upper bearing race for turning in respect to said base, an annular gear means fixed on said table at the outer periphery thereof and power driven gear means fixed to said base engaged with said annular gear means for turning said work table to any desired position in respect to said base, an annular locking channel having upper and lower flanges formed on said table structure disposed radially inwardly of said bearing, double annular shoe means carried by said base with one shoe means disposed axially adjacent a flange of said annular locking channel, and an annular fluid actuated axially expansible means disposed axially between each said shoe means and said base adapted when expanded to move said annular shoe means into engagement with said annular locking channel on said table structure axially gripping said tongue and fixing said work table in any position to which it may have been turned for machining operations and the like without transmittal of any material increase in loading on said anti-friction bearing as a result of said operations.

4. In a work table mechanism of the class described including a base, a work table adapted to support work thereon, an antifriction bearing fixed on said vase revolvably supporting said work table near the outer periphery thereof, an annular gear means fixed on said table at the outer periphery thereof and a power driven gear means engaged with said annular gear means for revolving said work table, an annular channel fixed concentrically on said work table, an annular locking tongue including a pair of annular locking shoes non-turnably mounted on said base and resiliently disposed in spaced relationship within said annular channel, and fluid actuated means disposed between said pair of locking shoes adapted to move the same into gripping engagement with said channel whereby to provide additional support for said work table on said base in any revolved position substantially independently of said anti-friction bearing.

5. In a work table mechanism of the class described including a base, an indexible work table adapted to support work thereon, an anti-friction bearing fixed on said base revolvably supporting said work table near the outer periphery thereof, an annular gear means fixed on said table at the outer periphery thereof and a power driven gear means engaged with said annular gear means for revolving said work table, the said work table including a radially inwardly disposed annular channel, an annular locking tongue consisting of a pair of annular locking shoes non-turnably mounted on said base and resiliently disposed in spaced relationship within and in respect to said annular channel, and fluid actuated tubular means disposed and retained between said pair of locking shoes adapted to move the same into gripping engagement with said channel whereby to support said work table on said base in any revolved position and relieve said anti-friction bearing of excess loading from machining operations performed on work supported by said work table.

References Cited in the file of this patent
UNITED STATES PATENTS

| | | |
|---|---|---|
| 1,998,811 | Heaton | Apr. 23, 1935 |
| 2,058,060 | Charles | Oct. 20, 1936 |
| 2,155,680 | Pfauter | Apr. 25, 1939 |
| 2,446,694 | Dickson | Aug. 10, 1948 |
| 2,557,837 | Opel | June 19, 1951 |
| 2,585,828 | Pearson | Feb. 12, 1952 |
| 2,710,078 | Cardwell | June 7, 1955 |
| 2,808,741 | Bellmann | Oct. 8, 1957 |